Dec. 28, 1965 H. H. WILSON, JR., ETAL 3,226,481

F.M. SUM AND DIFFERENCE STEREO RECEIVER
HAVING COMPENSATION MEANS
Filed Sept. 7, 1962

INVENTORS
HARRY WILSON, JR.
ABRAM HOPENGARTEN
BY
Fordyce A. Bothwell
ATTORNEY

United States Patent Office 3,226,481

Patented Dec. 28, 1965

3,226,481
F.M. SUM AND DIFFERENCE STEREO RECEIVER HAVING COMPENSATION MEANS

Harry H. Wilson, Jr., Philadelphia, and Abram Hopengarten, Lafayette Hills, Pa., assignors to Philco Corporation, Philadelphia, Pa., a corporation of Delaware Filed Sept. 7, 1962, Ser. No. 222,066
1 Claim. (Cl. 179—15)

This invention relates to stereophonic receivers adapted to receive the now-standard F.M. multiplex signal. More particularly the invention relates to demodulation of the composite signal by time division switching or sampling.

As is now well known, the standard F.M. multiplex signal comprises a composite signal which is transmitted on an F.M. carrier and which includes relatively low and high frequency sum and difference ($L+R$ and $L-R$) components and also a 19 kc. pilot carrier or phase reference signal. The difference component consists of amplitude modulation of a suppressed 38 kc. subcarrier. It is also well known that the composite signal can be demodulated utilizing either the matrixing principle or the time division switching (sampling) principle, but the latter has the advantage that it does not require matched-phase low-pass and band-pass filters which are necessary in the matrix-type demodulation circuits.

In the time division switching or sampling type demodulation process, the composite signal is supplied to two switching or sampling devices, and two 38 kc. switching voltages of opposite polarity are also supplied to said devices. The switching voltages are produced in response to the 19 kc. pilot carrier, e.g. by means of an amplifier-doubler circuit.

While sampling type demodulation has the advantage above-mentioned, it has the disadvantage that it tends to introduce error in that the output signal derived from the difference ($L-R$) component of the composite signal tends to be of smaller amplitude than the output signal derived from the sum ($L+R$) component. Moreover this error increases in proportion to the sampling angle and becomes greatest when the sampling angle is 180° for most efficient demodulation. While the error can be reduced to insignificance by using a very small sampling angle, this results in very inefficient demodulation.

The principal object of the present invention is to provide a satisfactory solution of this problem.

In accordance with this invention, provision is made in the demodulation stage for relatively varying the amplitudes of the sum and difference components of the composite signal so as to compensate for the error introduced by sampling. More particularly a filter is provided in the demodulation stage which has different transfer impedance for said components so as to effect the desired compensation.

Figure 1:
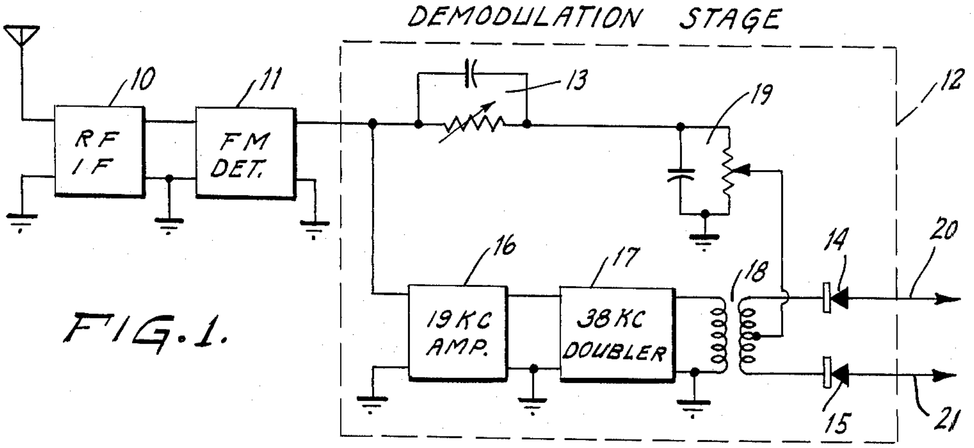
Figure 2:
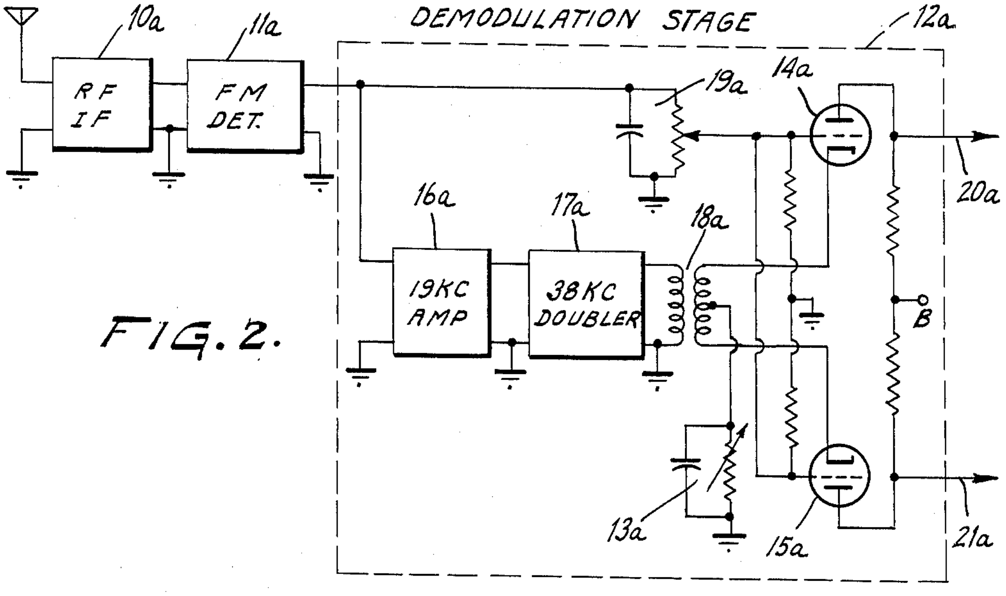

The invention may be fully understood from the following detail description with reference to the accompanying drawing wherein:

FIG. 1 is a diagrammatic illustration of a portion of a stereophonic receiver including one embodiment of the present invention; and FIG. 2 is a similar diagram showing another embodiment of the invention.

Referring first to FIG. 1, block 10 represents the conventional RF and IF stages and block 11 represents the conventional F.M. detector or discriminator stage of a receiver wherein the standard F.M. multiplex signal is received and amplified and the composite stereo signal is recovered from the F.M. carrier and is supplied at the output of the F.M. detector. The demodulation stage 12 for the composite signal is of the time division switching or sampling type.

Disregarding for the moment the RC filter 13 which is provided by this invention, the demodulation stage is of known form in which the sampling operation is performed by switching operation of two diodes 14 and 15. The 38 kc. switching voltages of opposite polarity are produced by deriving the 19 kc. pilot carrier, amplifying it in amplifier 16, doubling its frequency in doubler 17, and producing the switching voltages across the center-tapped secondary or transformer 18. The composite signal to be sampled is supplied through volume control 19 and the center tap of transformer 18 to the switching diodes 14 and 15. The signals derived by sampling appear at the output connections 20 and 21.

Still disregarding the filter 13, as stated above the sampling operation tends to produce error in the relative amplitudes of the signals derived from the sum and difference components of the composite signal, i.e. the signal derived from the difference component tends to be of smaller amplitude from the signal derived from the sum component.

In accordance with this invention, the RC filter 13 is provided to nullify or compensate for this error. This filter has greater transfer impedance for the relatively low frequency sum component than for the relatively high frequency difference component, and it may be adjusted so as to effect exact compensation. Thus by provision of a simple filter the invention overcomes the problem incident to sampling demodulation.

By way of example, the filter 13 may comprise a variable resistor having a maximum value of 500 kilohms and a capacitor having a value of 330 microfarads.

Referring now to FIG. 2, there is shown a receiver in which the demodulation stage is generally similar to that of FIG. 1 but employs triodes instead of diodes. In FIG. 2 the elements corresponding to those of FIG. 1 are designated by the same reference numerals with the suffix *a*.

In the demodulation stage of FIG. 2 the composite signal from the F.M. detector 11*a* is supplied through volume control 19*a* to the grids of the switching triodes 14*a* and 15*a*. The 38 kc. switching voltages of opposite polarity are produced as in FIG. 1 but in this instance these voltages are supplied to the cathodes of the switching triodes. Also in this instance the filter 13*a* of this invention is connected in the common cathode circuit of tubes 14*a* and 15*a*. This filter serves the same purpose as does the filter 13 in FIG. 1.

From the foregoing description it will be seen that this invention provides a simple solution of the error problem in a sampling type demodulation stage of a receiver for the F.M. multiplex signal.

While certain embodiments of the invention have been illustrated and described, it will be understood that the invention is not limited thereto but contemplates such modifications and further embodiments may occur to those skilled in the art.

We claim:

A stereophonic radio receiver adapted to receive a composite signal having a sum component, a difference component consisting of amplitude modulation of a suppressed subcarrier, and a phase reference signal, said receiver comprising a demodulation stage including a pair of switching triodes, means for supplying said composite signal to the grids of said triodes, a transformer having a primary winding and a center-tapped secondary winding, means responsive to said phase reference signal for supplying a sampling signal to said primary winding, means connecting the extremities of said secondary winding to the respective cathodes of said triodes, a filter connected between the center tap of said secondary winding and a point of fixed potential, said filter having greater transfer impedance for said sum component than for said difference component, and means for deriving from the anodes of said triodes the two stereophonic audio signals.

References Cited by the Examiner

UNITED STATES PATENTS

| | | | |
|---|---|---|---|
| 3,070,662 | 12/1962 | Eilers | 179—15 |
| 3,087,993 | 4/1963 | Van Hurick et al. | 179—15 |
| 3,099,707 | 7/1963 | Dome | 179—15 |
| 3,123,673 | 3/1964 | Stumpers et al. | 179—15 |
| 3,124,653 | 3/1964 | Schroeder | 179—15 |
| 3,133,993 | 5/1964 | DeVries | 179—15 |

OTHER REFERENCES

DeVries, IRE Transactions on Broadcast and Television Receivers, July 1961, pp. 67–72.

Von Recklinghausen, IRE Transactions on Broadcast and Television Receivers, November 1961, pp. 65–71.

DAVID G. REDINBAUGH, *Primary Examiner.*